United States Patent
Magyar et al.

(10) Patent No.: US 10,742,648 B2
(45) Date of Patent: Aug. 11, 2020

(54) MOBILE DEVICE ACCESS TO A PROTECTED MACHINE

(71) Applicant: LogMeIn, Inc., Boston, MA (US)

(72) Inventors: Gyula Magyar, Budapest (HU); Gyorgy Hevizi, Budapest (HU); Kornel Pal, Budapest (HU)

(73) Assignee: LogMeIn, Inc., Boston, MA (US)

( * ) Notice: Subject to any disclaimer, the term of this patent is extended or adjusted under 35 U.S.C. 154(b) by 9 days.

(21) Appl. No.: 15/618,544

(22) Filed: Jun. 9, 2017

(65) Prior Publication Data

US 2017/0359342 A1 Dec. 14, 2017

Related U.S. Application Data

(60) Provisional application No. 62/347,845, filed on Jun. 9, 2016.

(51) Int. Cl.
*H04L 29/06* (2006.01)
*H04W 12/00* (2009.01)

(52) U.S. Cl.
CPC ...... *H04L 63/0876* (2013.01); *H04L 63/0853* (2013.01); *H04L 63/126* (2013.01); *H04L 63/102* (2013.01); *H04L 63/18* (2013.01); *H04W 12/00503* (2019.01)

(58) Field of Classification Search
None
See application file for complete search history.

(56) References Cited

U.S. PATENT DOCUMENTS

| | | | |
|---|---|---|---|
| 2009/0254975 A1* | 10/2009 | Turnbull | H04L 63/0492 726/3 |
| 2013/0237155 A1* | 9/2013 | Kim | H04W 12/06 455/41.2 |
| 2014/0049367 A1* | 2/2014 | Ahearn | G07C 9/00174 340/5.61 |
| 2014/0094119 A1* | 4/2014 | Stojanovski | H04W 4/70 455/41.1 |
| 2014/0123224 A1* | 5/2014 | Nosrati | H04W 12/06 726/3 |
| 2014/0123273 A1* | 5/2014 | Matus | G06F 21/32 726/17 |

(Continued)

*Primary Examiner* — Shin-Hon (Eric) Chen
(74) *Attorney, Agent, or Firm* — David H. Judson

(57) ABSTRACT

In a first embodiment, the "one tap" operation of this disclosure enables a user having a mobile device "one tap" mobile application (or "app") to log-in to the user's desktop or laptop computer by bringing the user's device in physical proximity to the computer and, while in such proximity, accepting a push notification that is received on the mobile device. In a second embodiment, the user uses the "one tap" functionality to access a cloud-based account that has been set up for the user on a third party web application (e.g., SalesForce.com). The technique seamlessly integrates with third party websites using well-known protocols (e.g., SAML2), and it enables secure cross-origin resource sharing in a highly secure, reliable and available manner. Still another aspect of this disclosure is an enhanced proximity detection routine that is used to facilitate the one tap function when the user's mobile device is moved into proximity with the computer.

10 Claims, 5 Drawing Sheets

(56) References Cited

U.S. PATENT DOCUMENTS

| | | | |
|---|---|---|---|
| 2014/0282877 A1* | 9/2014 | Mahaffey | H04L 63/0853 |
| | | | 726/3 |
| 2016/0037345 A1* | 2/2016 | Margadoudakis | H04L 63/0853 |
| | | | 455/411 |
| 2016/0226883 A1* | 8/2016 | Kusens | G06Q 30/0207 |
| 2016/0269403 A1* | 9/2016 | Koutenaei | H04L 63/0861 |
| 2017/0061424 A1* | 3/2017 | Dent | G06Q 20/3227 |
| 2017/0094510 A1* | 3/2017 | Khosravi | G06F 21/32 |

\* cited by examiner

US 10,742,648 B2

MOBILE DEVICE ACCESS TO A PROTECTED MACHINE

BACKGROUND

Technical Field

This disclosure relates generally to remote support technologies, products and services.

Background of the Related Art

Remote access technologies, products and systems enable a user of a remote computer to access and control a host computer over a network. Internet-accessible architectures that provide their users with remote access capabilities (e.g., remote control, file transfer, display screen sharing, chat, computer management and the like) also are well-known in the prior art. Typically, these architectures are implemented as a Web- or cloud-based "service," such as LogMeIn®, GoToMyPC®, WebEx®, Adobe® Connect, and others. For basic "remote access," an individual who uses the service has a host computer that he or she desires to access from a remote location. Using the LogMeIn software-as-a-service (SaaS), for example, the individual can access his or her host computer using a client computer or mobile device that runs a web browser or a mobile app. Such technologies also are leveraged to facilitate other network-based services, such a remote technical (IT) support, wherein a support technician connects to a local user's computer or mobile device to view, diagnose and fix some (local) technical problem, all from a remote location. LogMeIn Rescue™ is a representative service of this type.

Two-factor authentication (also known as 2FA) is a technology that provides identification of users by combining two different components, such as something that the user knows (e.g., username, password, PIN), and something that the user possesses (USB stick with a secret token, a bank card, a key) or something that is inseparable from the user (e.g. a fingerprint, iris, voice, typing speed, pattern in key press intervals, etc.). If, in an authentication attempt, at least one of the components is missing or supplied incorrectly, the user's identity is not established and access to the resource being protected by two-factor authentication is denied. The something possessed by the user may be a mobile device itself.

A number of two-factor authentication schemes use a Time-based One-time Password (TOTP) scheme, as defined Internet RFC 6238. TOTP is an algorithm that computes a one-time password from a shared secret key and the current time. TOTP is an example of a hash-based message authentication code (HMAC). It combines a secret key with the current timestamp using a cryptographic hash function to generate a one-time password. The timestamp typically increases in 30-second intervals such that passwords generated close together in time from the same secret key are the same. In a typical two-factor authentication application, a user enters his private credential (e.g., username and password) into a website, generates a one-time password (OTP) for the site using TOTP running locally on a smartphone, and types the OTP into the server as well. The server runs the same TOTP algorithm to verify the one-time password entered. The approach requires that a single secret key be shared between the server and the user's device over a secure channel ahead of time.

BRIEF SUMMARY

In a first aspect of this disclosure, a "one tap" operation enables a user having a mobile device "one tap" mobile application (or "app") to log-in to the user's desktop or laptop computer by bringing the user's device in physical proximity to the computer and, while in such proximity, accepting a push notification that is received on the mobile device.

In a second aspect, the user uses the "one tap" functionality to access a cloud-based account that has been set up for the user on a third party web application (e.g., SalesForce.com). The technique seamlessly integrates with third party websites using well-known protocols (e.g., SAML2), and it enables secure cross-origin resource sharing in a highly secure, reliable and available manner.

Still another aspect of this disclosure is an enhanced proximity detection routine that is used to facilitate the one tap function when the user's mobile device is moved into proximity with the computer. The routine does not need to estimate actual user distance; rather, the routine outputs relatively coarse-level states, such as three (3) ranges for signal values: (i) high signal level (high confidence that the device is in the proximity), (ii) low signal level (high confidence that the device is distant enough so as to be treated as away), and (iii) middle range, between the high and low regions, and reserved as a transitional zone. What proximity state the user's mobile device is in then depends on his or her previous state. If the user came to the transitional zone from the high range, the system concludes he or she is still present (until the signal falls further to the low zone). If, however, the user came to the transitional zone from the low zone, he or she is still treated as away (until the signal rises into the high zone).

The foregoing has outlined some of the more pertinent features of the subject disclosure. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

The technique of this disclosure enables an end user to access protected sites using a conventional TOTP-based two factor authentication (2FA) scheme. As used herein, the term "site" typically refers to a website (or some protected portion thereof), but the reference to a "site" should be broadly construed to refer to any protected resource available from a server or other computing entity. The resource may be the overall site, a portion of the site, a page, a document or other file, or even just a single object. Typically, the end user has associated therewith both a mobile device running one or more mobile applications (or "apps") including the "one tap" app of this disclosure (as will be described), as well as a second computing machine, such as a laptop or desktop running a web browser. The mobile device may be a smartphone, tablet or wearable (e.g., Apple iPhone® and iPad® tablet, iWatch™, Google® Glass™, and others), an IoT device or appliance, or the like. The mobile app be downloaded and installed via a mobile application delivery service, such as the Apple® App™ Store, Google Play Store (or equivalents), or it may be provided as a native application on the mobile device.

Figure 1:
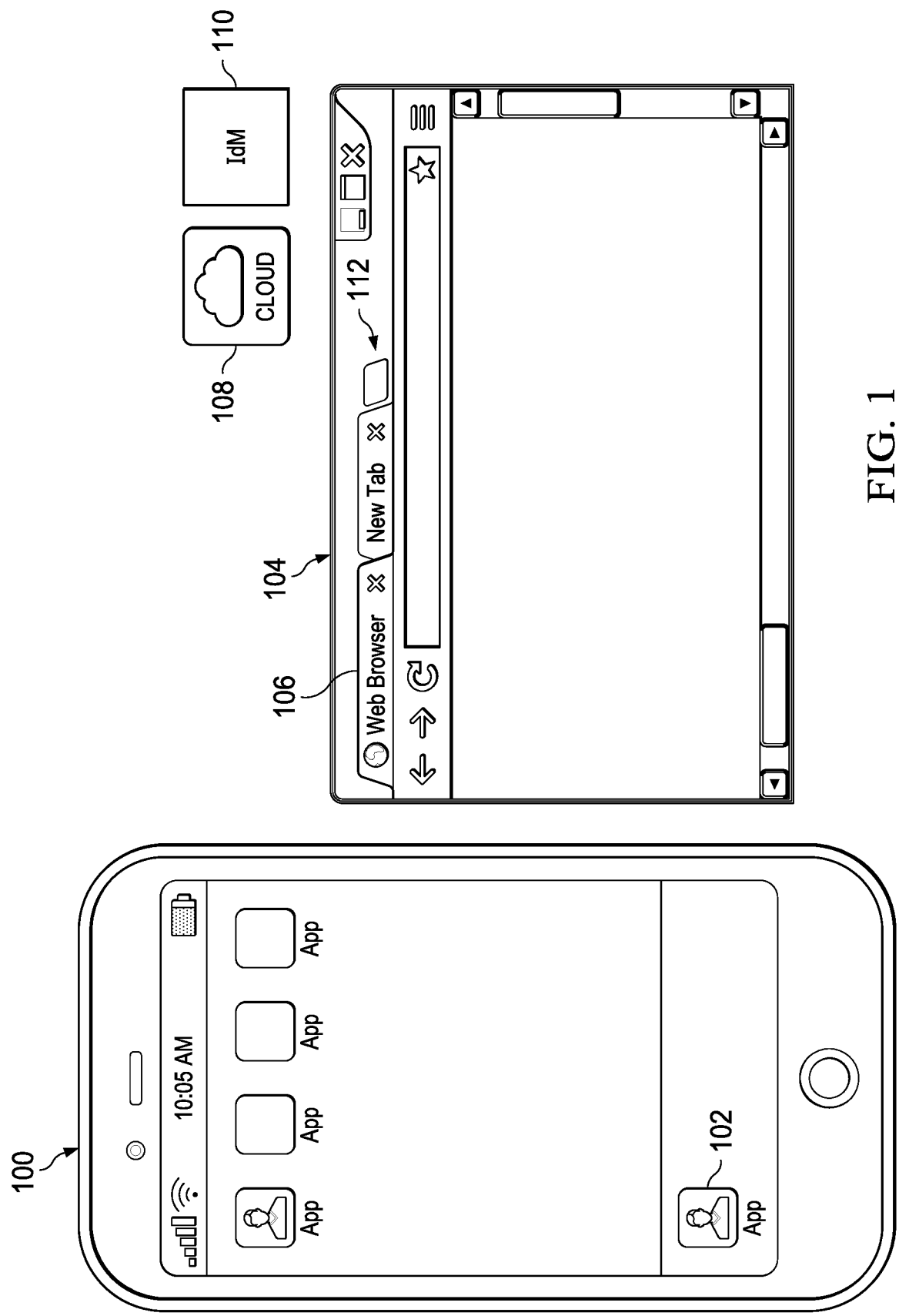
FIG. 1 depicts the various components in which the techniques of this disclosure may be carried out.

Referring now to FIG. 1, and by way of further background, the technique of this disclosure typically involves a set of computing elements: an end user mobile device 100 running a mobile app 102, a computing entity 104 running a web browser 106, and a cloud service 108 having an identity manager 110. The identity manager 110 includes a data repository, e.g., that stores TOTP secrets (namely, a TOTP-shared secret per user per site) and other information. Each of the mobile device 100 and 110 are enabled to provide TOTP-based 2FA. As also depicted in FIG. 1, web browser 106 is augmented with a browser plug-in 112 that facilitates various operations described below. Although a browser plug-in 112 is a preferred implementation, the functions of this plug-in may also be implemented in other ways, e.g., an applet, an ActiveX control, JavaScript, native code, or the like. In one non-limiting embodiment, the cloud service 108 is implemented in associated with a remote access architecture, such as LogMeIn®.

A remote access architecture of this type is known. For example, the architecture may comprise "n-tiers" that include a web server tier, a database tier, and a gateway tier. The web server tier comprises a plurality of machines that each executes web server software. The web server tier provides an Internet-accessible web site. Preferably, the web site associated with a site domain (however designated) is available from multiple locations that collectively comprise the web server tier. The database tier comprises a plurality of machines that each executes database server software. The database tier provides a network-accessible data storage service for generating and storing data associated with end user sessions to the remote access service. The gateway tier comprises a plurality of machines that each executes application server software. The gateway tier provides a network-accessible connection service for establishing and maintaining connections between and among the participating end user computers. Although not shown, preferably end user computers connect to the gateway servers over secure connections, e.g., over SSL, TLS, or the like. A representative machine on which the web server, database server or gateway server executes comprises commodity hardware (e.g., one or more processors) running an operating system kernel, applications, and utilities.

Generalizing, one or more functions of such a technology platform may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

As additional background, it is well-known that web applications—especially those supported in the cloud—increasingly are becoming more dependent on federated computing environments, as well as out-of-band authentication. In a "federation," entities cooperate such that users in one entity leverage relationships with a set of entities through an entity's participation in the federation. Users can be granted access to resources at any of the federated entities as if they had a direct relationship with each one. Users are not required to register at each entity and are not required to identify and authenticate themselves. More formally, a federation is a set of distinct entities (enterprises, logical units within an enterprise, etc.) that cooperate to provide a single-sign-on experience to a user. This type of environment differs from a typical single-sign-on (SSO) environment in that two entities do not need to have a direct, pre-established, relationship defining how and what information to transfer about a user. Within a federated environment, entities provide services that deal with authenticating users, accepting authentication assertions (e.g., authentication tokens) that are presented by other entities, and translating the identity of the vouched-for user into one that is understood within the local entity. Federation reduces costs and administrative burdens on a service provider, who relies on trusting the federation itself instead of managing authentication information.

In a typical operation, a federated environment allows a user to authenticate at a first entity. The first entity provides the user with an authentication "assertion" about the user for use at a second entity. The user can then access protected resources at a second, distinct entity, by simply presenting the authentication assertion that was issued by the first entity. The user does not have to authenticate again at the second entity, but simply passes-in the assertion obtained from the first party.

Specific entities can take on specific roles in the context of a federated environment. An identity provider (IdP) is a specific type of service that provides identity information as a service to other entities within the federation. Typically, the entity that issues assertions is the IdP; once a user obtains an assertion by authenticating to the IdP, the other entities in the federation are service providers for the duration of the particular federated session or transaction.

The Security Assertion Markup Language (SAML) is an XML-based standard for exchanging authentication and authorization data between security domains, such as between an identity provider and a service provider. SAML assumes that a principal (often a user) has enrolled with at least one identity provider, which provides local authentication services to the principal. A service provider relies on the identity provider to identify the principal. At the principal's request, the identity provider passes a SAML assertion to the service provider. On the basis of this assertion, the service provider (SP) makes an access control decision.

By way of additional background, Cross-origin resource sharing (CORS) is a mechanism that allows restricted resources on a web page to be requested from another domain outside the domain from which the resource originated. CORS defines a way in which a browser and server can interact to determine safely whether or not to allow the cross-origin request. Under the CORS standard, HTTP headers provide browsers and servers a way to request remote URLs only when they have permission. Although some validation and authorization can be performed by the server, it is generally the browser's responsibility to support these headers and respect the restrictions they impose.

One Tap Login

Figure 2:
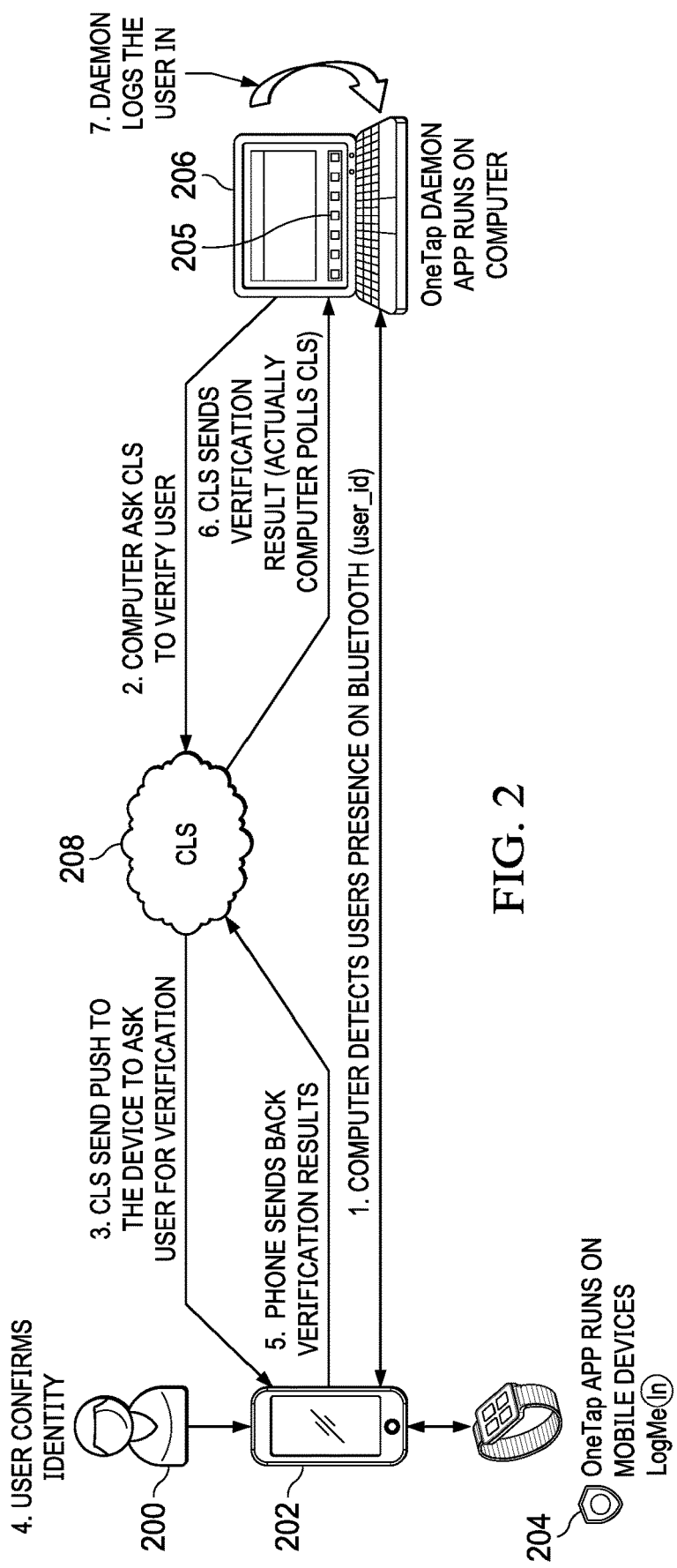
FIG. 2 is a first embodiment by which a mobile device user performs a one-tap login to another machine under his or her control, using an intermediary identity provider to facilitate the operation.

In a first embodiment, which is depicted in FIG. 2, the "one tap" operation of this disclosure enables a user 200 having a mobile device 202 "one tap" app 204 to log-in to the user's desktop or laptop computer 206 by bringing the user's device 202 in physical proximity to the computer 206 and, while in such proximity, accepting a push notification that is received from the identity provider 208 on the mobile device.

FIG. 2 depicts the actual use case. Before this use occurs, the various devices must first be configured. To access and use the "one tap" service of this disclosure, preferably a user first downloads and installs a configurator process 205 locally at his or her computer 206. This process is referred to herein as a daemon, which executes as a background configurator process in the computer. The daemon process 205 may be accessed from a download link on the service provider's site (e.g., as rendered by the web server tier), from a third party site, or the like, or it may be provided as native code. The daemon process may be a standalone process or program (more generally, a set of computer program instructions executed on one or more processors), or part of a larger set of code. Once downloaded and installed, the daemon process launches a configurator flow, which displays a login screen by which the user either "signs-up" for the service (e.g., by registering a new account in the service provider's identity provider (IdP) service), or by logging-in with an existing account that the user already maintains with the service provider. Once sign-up or log-in is completed, the daemon process configurator generates and issues to the user an email, SMS message, or other notification with instructions about how to obtain a mobile device application (the "mobile app") 204 that will be used for the service. Typically, the instructions are provided in an email that includes a link to an application store (e.g., the Apple App Store). From his or her mobile device, and with the daemon configurator process still active on the desktop/notebook computer, the user then selects the link, navigates to the store, and downloads and installs the mobile app 204 if he or she does not already have it installed on the mobile device 202. Once installed, the mobile device app 204 launches an on-boarding workflow that instructs the user to confirm that the "one tap" mobile app is installed and running on the device.

In particular, at this point in the configuration it is necessary to pair (or, more generally, "associate") the mobile device 202 with the user's account as established through the daemon 205 running on the computer 206. To this end, the configurator process 205 then resumes control and generates (or obtains) and displays to the user a QR (or a similar) code. The code encodes information about the user's account information. The user opens the mobile device camera (or other scanner app) and captures the daemon-displayed QR code. Once the pairing is successful, a notice to this effect is generated and output on both devices. A Bluetooth (or the like) connection between the devices is then established and completed. Once this operation completes, the configurator process 205 opens up a final dialog requesting that the user enter his or her computer access credential (the credential the user uses to log-in to the computer 206). Once the user does so, the configuration is complete.

Thus, there are two (2) user identities "bound" during this setup, namely, the user's "account" credential associated with the service provider, as well as the user's "login" credential associated with his or her computer. Within the service provider's infrastructure 208, both of these identities are associated (or bound) to the computer and the mobile device. Typically, this data set is stored securely within a database management system 210 or the like.

With the above-described configuration in place, a typical use case scenario is that the user having the mobile device 202 in his or her possession can log-in to the computer account by simply coming into physical proximity with the computer 206 and carrying out the below-described "one tap" operation from the mobile device. In particular, when the mobile device is close enough to the computer, the computer triggers the service provider CLS 208 to send a push notification to the mobile device. When the user receives the push notification, he or she selects the notification, which opens up the mobile device app 202. The notification page on the mobile app typically identifies the user's "one tap" user identifier, and it may also include a separate request identifier (e.g., a five (5) character code) that the service provider uses to track the invite. Opening the notification preferably also starts a count-down timer that is rendered in the notification page. The timer provides a short window (e.g., one minute) for the user to access the login request, e.g., by selecting a Verify button on the screen. If the user selects the Verify button with the time window specified and the interaction completes, the user is logged into his or her computer (account) automatically. In other words, the user's timely response to the push notification opens up access to the computer without any additional requirements, e.g., to open a particular application, re-enter the user's computer credential, etc. The "one tap" on the Verify button is all that is required.

If the user then moves the mobile device away from the computer, at some distance apart the device loses Bluetooth connectivity with the computer. In such case, the mobile device does not work to access the computer and the account (in other words, the "one tap" function is said to be locked down). The lock-down may occur after a configurable time-out (e.g., 0-30 seconds) following loss of connectivity, and it may be accompanied by a screen notification to this effect on the computer. For example, the screen notification may indicate that the mobile device is out-of-range and that the computer is locked (or will be after a certain count-down is reached). When the user then moves the mobile device back into physical proximity, the one tap function once again is activated.

As can be seen then, and according to the techniques of this disclosure, a two factor authentication (2FA) is enabled by a single user "tap" operation. In this approach, a first factor authentication is carried out by (a) something the user possesses and, in particular, a mobile device whose proximity to the computer initiates the process (with the mobile device being used as a signal source for the proximity detection), and (b) something the end user knows, such as a PIN or other touch-based identifier (as represented by the user's previously-associated account credential), and that can be entered (on the local computer) with a single tap operation on the mobile device. When the end user's mobile device is determined to be within a given proximity to the user's local machine, the 2FA technique is initiated; if the one tap is then received, the user is logged in automatically to his or her local machine.

FIG. 2 depicts this operation in detail. As noted, here the end user desires to log into his or her local machine 206 with the support of the one tap service that is provided by a service provider, such as a remote access provider (e.g., logmein.com). In this scenario, and has been described, the end user has associated therewith both an end user-based mobile device 202, and an end user machine 206. The device 202 has been paired with the machine 206 in the manner previously described, and thus the service provider has generated and stored a "data set" that associates the mobile device, the machine, and the user's two identities. In this first embodiment, the remote access provider (or, more generally, the cloud service) has associated therewith its own cloud-based identity provider (IdP) 208 that provides identity provider services. These identity provider services are sometimes referred to herein as a Common Login Service (CLS). The particular nature of the cloud service or the CLS are not a limitation. In this embodiment, the end user mobile device 202 operates the "one tap" access mobile app 204 and the associated daemon 205 is installed and executes on the end user's machine 206 as previously explained. Both the end user mobile device 202 and the end user machine 206 are assumed to support near-field style communications, e.g., over a Bluetooth (BT) connection, or some equivalent. In one alternative embodiment, the device proximity is managed by another protocol (e.g., ZigBee).

Figure 3:
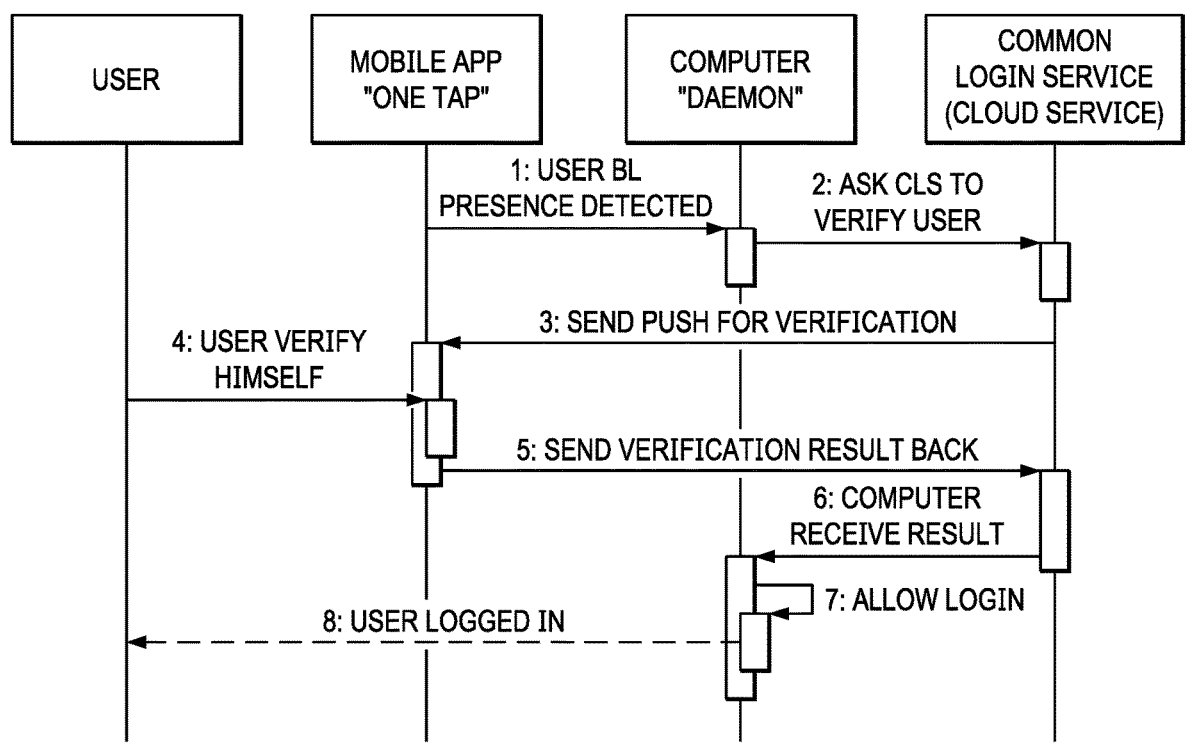
FIG. 3 is a UML interaction diagram depicting the flow of control and data among the various components shown in FIG. 2.

With reference to a local login scenario depicted in FIG. 2 and its associated UML sequence diagram in FIG. 3, it is assumed that the Bluetooth connection between devices 202 and 206 is active, and that current access to the computer is restricted (i.e., the computer is on but otherwise "locked" down). The local login scenario starts with the end user having the mobile device 202 approaching his or her machine 206. At step (1), the user's presence (by virtue of the Bluetooth connection signal strength) is detected by the one tap daemon 205 operating on the machine 204. At step (2), the daemon 205 operating on the machine 206 asks CLS 208 to verify the user, preferably via a push notification and response interaction. Preferably, no further verification is required at this point due to prior association of the mobile device, the computer, and the user identities (as maintained in the data set). In response, and at step (3), the CLS 208 issues a push notification to the end user mobile device 202. As noted above, the push notification asks the user to verify that the access and login should proceed. This is the "one tap." At step (4), and in response to the mobile app 204 prompting the user to accept the received push notification, the user verifies himself/herself. Upon a success verification, and as depicted in step (5), the mobile app 204 sends a verification result back to the CLS 208. This verification result establishes that the user has responded to the push notification. At step (6), and preferably in response to a poll from the machine daemon 205, the CLS 208 returns a verification result to the daemon 205. The CLS may return this result proactively (i.e., without a poll). At step (7), the daemon 205 automatically logs the user into his or her machine 206 (based on the previously-associated computer access credential) to complete the auto-login. Access to the computer is then enabled without the user having to take any additional action (other than responding to the push notification within any configurable time-out). This completes the processing.

Cloud Account-Based Access

According to another embodiment, which is now described, the approach also enables the user to access a cloud-based account that has been set up for the user on a third party web application (e.g., SalesForce.com). The technique herein seamlessly integrates with third party websites using well-known protocols (e.g., SAML2), and it enables secure cross-origin resource sharing in a highly secure, reliable and available manner.

Figure 4:
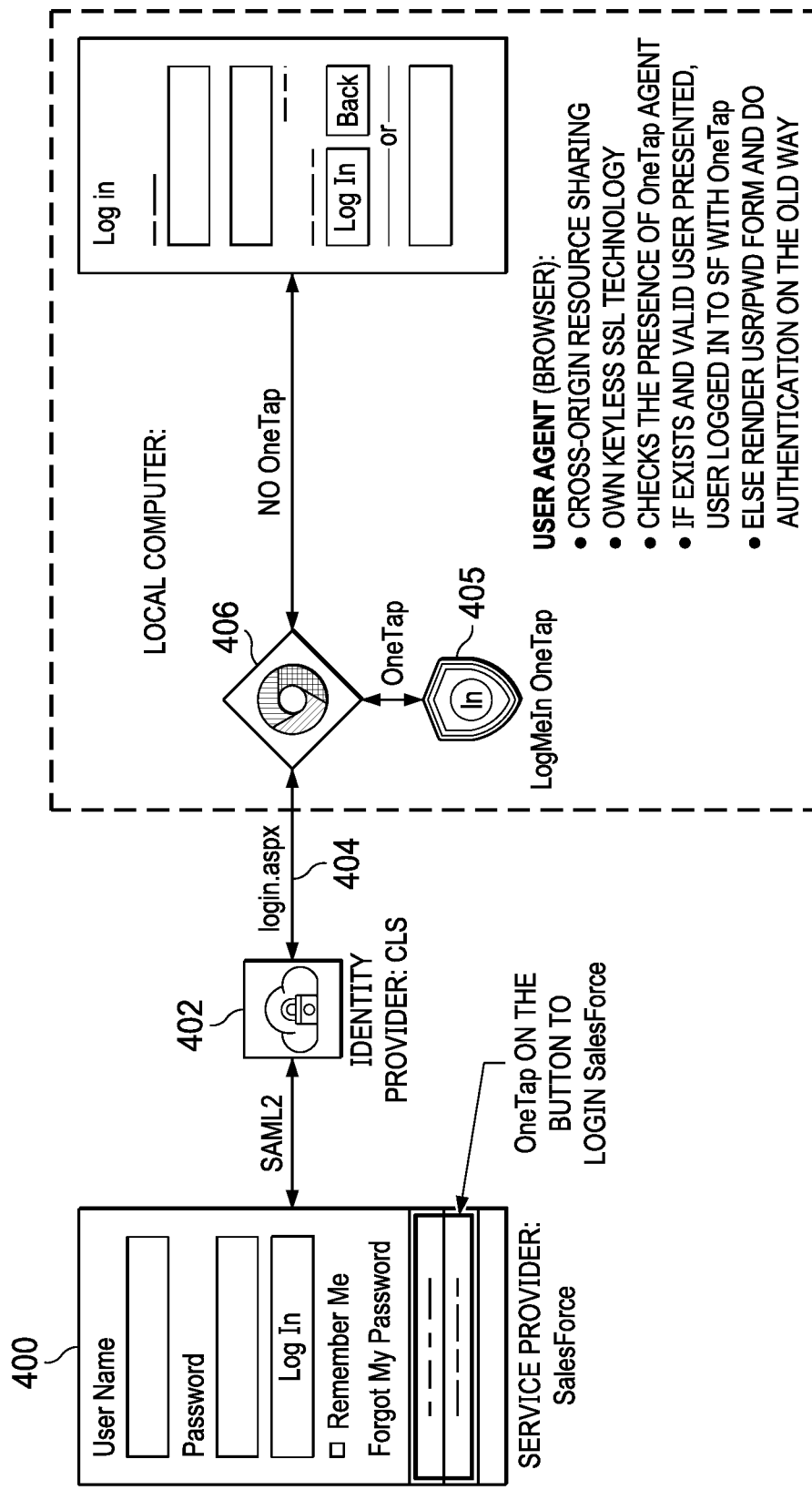
FIG. 4 is a second embodiment by which a mobile device user performs a one-tap login to a third party cloud application, once again using an intermediary identity provider to facilitate the operation and in association with the user's local machine.

With reference now to FIG. 4, in this example scenario it is assumed that a cloud service provider (SP) 400 (e.g., SalesForce®) is already federated with an identity provider CLS 402, e.g., through the SAML2 protocol. The integration of the identity provider and the service provider thus is an external process that is not an aspect of this disclosure. In addition, it is assumed that one or more users of the service provider's cloud service (whatever it may be) are configured with the cloud service. Typically, this means that a particular user has the capability of opening his or her web browser to the cloud service and entering a credential that enables that user to access the cloud service. In this example scenario, that access is facilitated by the remote access service provider and in part using the "one tap" function (assuming it is enabled as has been described). Thus, in this example, the identity provider 402 is a component of the remote access service provider infrastructure (as opposed to the cloud service itself), although this is not a limitation.

As depicted in FIG. 4, in one approach to cloud service login, the service provider 400 exports a web-based login page 404 to the user's web browser 406, which then renders that page. (The left portion of the drawing also shows the service provider login page). The service provider login page 404 provides several logon options, including (in this example) the possibility of the user logging in through the remote access provider. To that end, the page includes button 405, which provides an option for the user (e.g., using a web browser running on his or her local machine) to log in to the cloud service via his or her previously-established remote access service credential (e.g., "LogMeIn ID" in this example). As also shown in FIG. 4, it is assumed that the user's local computer has the daemon process installed and configured, as previously described. Preferably, the daemon process runs as localhost in the user's machine and thus may access the network services that are running on the host via a loopback network interface.

Figure 5:
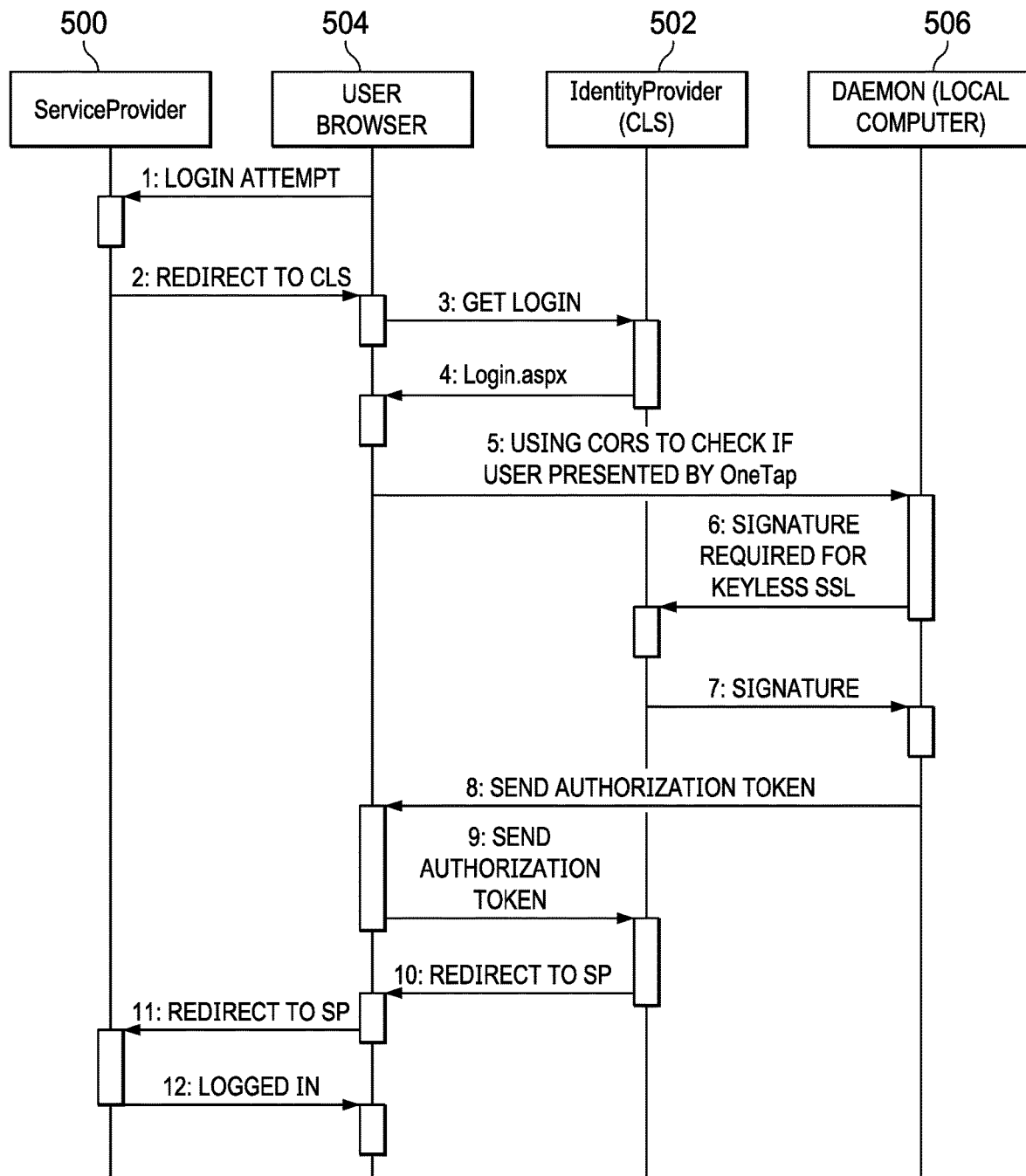
FIG. 5 is a UML interaction diagram depicting the flow of control and data among the various components shown in FIG. 4.

A typical operation in this embodiment is described with respect to the UML sequence diagram in FIG. 5. This diagram depicts the SaaS provider 500, and the identity provider (IdP) 502 such as the CLS described above. The user's local machine functionality is shown in two parts, namely: browser 504, and the daemon 506. The identity provider 502 interacts with these components as shown but without being aware that the components 504 and 506 are operating on the same machine. The daemon 506 is configured in the manner described above and thus has knowledge of the user's local identity (the account credential), and it interacts with the one tap app on the mobile device (not shown) in the manner previously described. In one embodiment, the daemon may execute in the local computer as a web server running localhost, as described above.

Assuming that the SaaS provider and the IdP are federated, a normal flow would proceed in part using the one tap approach described above with respect to FIGS. 2 and 3. In particular, when the user approaches the local computer with his or her mobile device, and if the one tap app is enabled and the user is then verified (per the push notification method), the user logs into the SaaS application with one tap, as further explained in detail below.

While the approach thus is similar to the local login use case (FIGS. 2 and 3), implementation can be complex because of the distributed components in the local machine and the requirement that interactions among the components (namely, the browser, the identity provider, and the local daemon process) must be carried out in a manner that the identity provider expects; else, the automated login cannot succeed. This is further complicated by the fact that calls to an encrypted website require issuance of a valid certificate (cert) so that protection of the private key necessary for decryption can be assured. To allow for a scalable solution, it is desirable to avoid having to provide a certificate to each and every host that will be running the daemon. To address this problem, preferably private key operations for the hosts are centralized in a key server that is operated by or on behalf of the CLS. A DNS entry is pointed to the key server, which stores the private key needed for decryption operations. This is sometimes referred to herein as "keyless SSL," and it enables the daemon operating on the localhost connection to facilitate authentication and thus enable decryption. The "keyless" notion refers to the fact that necessary private key is supported in the CLS as opposed to being on the local host itself.

FIG. 5 depicts the typical process flow for website login according to this disclosure. At step (1), a login attempt from the browser 504 is attempted, e.g., by the user selecting the button 405 in the login page 404 (of FIG. 4). At step (2), the service provider issues an HTTP redirect (e.g., an HTTP 302 command), which the browser follows to the identity provider 502. At step (3), the browser requests a login page (e.g., "login.aspx") from the identity provider. In response, and at step (4), the identity provider 502 returns the login page to the browser 4504. The login page includes a script, e.g. written in JavaScript, that is automatically executed when the browser interprets the login page. Execution of the script initiates an inter-process communication between the browser 504 and the daemon 506. As noted above, and although these two processes execute on the same local machine, the identity provider 502 is not aware of this fact. At step (5), the browser executes the script to determine whether the user presented himself/herself via the one tap mechanism described above. The process of FIG. 3 may then be carried out, as previously noted.

At this point in the process flow, an additional authentication token (representing the user's cloud identity (the CLS account)) needed for SaaS login is still required. The daemon is responsible for generating the token but it must cooperate with the IdP to do so (since the daemon does not have the private key). Thus, at step (6), the daemon 506 issues a signature request to the CLS 50. The daemon locates the IdP by performing a DNS lookup or otherwise having knowledge of the IdP's address. (By using a DNS-based approach to enable local hosts to find the CLS), the provider of such services can leverage a distributed approach that provides enhanced scalability, availability and reliability). The identity provider uses the private key to generate the signature, which it then returns to the daemon 506 at step (7). Steps (6) and (7) thus are optional if the daemon 506 does not need the signature (or can otherwise perform the decryption required). At step (8), the daemon 506 generates and sends an authentication token to the browser 504 together with a redirect. At step (9), the browser 504 follows the redirect back to the identity provider 502, passing the authentication token. At step (10), and after verifying the token, the identity provider issues a redirect back to the service provider 500. At step (11), the service provider 500 follows the redirect back to the browser 504, and the end user is logged in. This completes the processing.

Proximity Detection

The following provides additional details regarding preferred techniques that may be used to implement the Bluetooth-based proximity detection scheme underlying the one-tap operations. As is well-known, measuring Bluetooth received single strength (RSSI) is generally considered too unreliable to be used to measure distance between devices. Environmental obstacles, reflections, device's transmission policy, etc. all make it noisy and unpredictable. According to this disclosure, the one-tap application (running in the daemon) provides a computationally-efficient pre-filtering on the incoming signals to reduce the effect of noise and short-term temporal fluctuations. In addition, preferably a multi-level switching method is implemented with respect to the filter's output to facilitate a determination that the mobile device is in proximity to the local machine from which the actual logon (via one-tap) is desired.

Based on empirical observation (of RSSI data), it has been determined that there is usually a condensation of measured values around a high energy level, whereas the rest of the samples are located in lower energy regions. While the pattern of the low energy scatter is difficult to characterize and frequently varies over time, the condensed higher energy measurements have a tendency to form a recognizable upper plateau. Typically, there are outlier measurements about this level, but their number is significantly smaller than the lower region's noise. Focusing on this upper plateau, it is possible to obtain a value assigned to single strength that is resistant to short term noise. To this end, a preferred algorithm is as follows.

A time window of interest is defined (or prefigured by default). Preferably, only recent examples belonging to this time window are considered. A sampling rate at which RSSI values are sampled in then defined (or preconfigured by default). The measured samples are not required to be equidistant, as the method is resistant to local variances in measurement rate. A reject parameter is then defined (or preconfigured) for excluding the high energy outliers. The samples with highest energy are excluded from the next steps, up to this number. This reject parameter either can be specified by an absolute number or as a fraction of samples within the window of interest. (e.g., reject the three highest measurement, but max. 10 percent, or so). With the above configuration, the high value regions are then determined. There may be one or more variants to focus on the high value regions. In a first variant, define a 'lower reject' parameter (e.g. exclude the lower 60% of the samples). The average of the remaining samples is then calculated and assigned as the signal level for the current time. In a variant, the median of the remaining data is calculated and the average of samples above the median is then taken. In another variant, the maximum of the remaining subset after excluding the highest energy measurements is calculated. The above methods give very close results in most situations. The third approach is preferred because it is very efficient to calculate and shows the most balanced performance. The pre-filtered signal generated according to this process has a better RSSI characteristic than the raw data. That said, assigning an exact or even approximate (continuous) distance with the device is not feasible. Typically, this is because environmental influences prevent this value from being strictly proportional with proximity; further, long-term level shifts in transmission power can occur even if the device does not move.

According to this disclosure, the proximity detection routine executing in the daemon does not need to estimate actual user distance; rather, the routine outputs coarse-level states, such as (a) the user is present, or (b) the user is away (not present). While this approach works for the intended purpose (of indicating proximity), it is preferred to include at least one more level of discrimination. This is because a single threshold (present or away) may trigger false state changes when the signal level fluctuates close to the threshold value. To this end, preferably there are three (3) ranges for signal values (i) high signal level (high confidence that the device is in the proximity), (ii) low signal level (high confidence that the device is distant enough so as to be treated as away), and (iii) middle range, between the high and low regions, and reserved as a transitional zone. The concluded state of the user then depends on his or her previous state. If the user came to the transitional zone from the high range, the system concludes he or she is still present (until the signal falls further to the low zone). If, however, the user came to the transitional zone from the low zone, he or she is still treated as away (until the signal rises into the high zone).

Systematic changes in signal level (level shifts) may occur either by device movement or other factors. As an extension, the proximity detection may also be configured to separate level shifts related to device's motion from shifts caused by other factors, such as Bluetooth channel changes, with the output of the detector then adjusted accordingly. Such level shifts may be recognized by heuristics, by machine learning methods, or the like.

An additional variation may be implemented when the Bluetooth communication is secured. In such case, the mobile device itself would function as a security token (compared to the FIG. 3 embodiment, wherein the mobile device is used to start the flow).

Enabling Technologies

A mobile device comprises a CPU (central processing unit), computer memory, such as RAM, and a drive. The device software includes an operating system (e.g., Apple iOS, Google® Android™, or the like), and generic support applications and utilities. The device may also include a graphics processing unit (GPU). It also includes a touch-sensing device or interface configured to receive input from a user's touch and to send this information to processor. The touch-sensing device typically is a touch screen. The touch-sensing device or interface recognizes touches, as well as the position, motion and magnitude of touches on a touch sensitive surface (gestures). The device typically also comprises a high-resolution camera for capturing images (e.g., QR codes), an accelerometer, a gyroscope, and the like.

The push notification may be provided to the mobile device in any convenient manner, e.g., Apple Push Notification (APN) Service (APN), Google push notification services (for iOS or Android), or the like.

The one tap function may be part of another mobile app (e.g., the LastPass® mobile password manager authenticator app), or a standalone app or function.

The information may be stored in the cloud service using a secure repository.

The cloud service may be associated with a remote access technology platform and service, such as LogMeIn.

In one embodiment, a cloud service provider provides the cloud service, the mobile device app, and the daemon.

In another embodiment, the cloud service provider provides the cloud service and the mobile device app.

In yet another embodiment, the cloud service provider may associate with a third party identity provider.

As noted above, preferably the cloud service is a technology platform that may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the cloud service comprises a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

The computing entity on which the browser and its associated browser plug-in run may be any network-accessible computing entity that is other than the mobile device that runs the authenticator app itself. Representative entities include laptops, desktops, workstations, other mobile devices or machines associated with such other mobile devices, and the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

The described commercial products, systems and services are provided for illustrative purposes only and are not intended to limit the scope of this disclosure.

The techniques herein provide for improvements to technology or technical field, namely, cloud-based access control, as well as improvements to various technologies such as secure authentication, and the like, all as described.

Having described our invention, what we now claim is as follows. Having described our invention, what we now claim is as follows.

The invention claimed is:

1. A network-based access method operative in association with a first device of a user, and a second device of the user, comprising:
    associating, in a data set, information that binds the first device to the second device, and that binds the first device to a credential enabling access by the user to the first device;
    upon receipt of an indication that the second device is and remains in current physical proximity to the first device that is presently locked, determining whether the user can be verified, wherein the determination includes causing a notification to be delivered to the second device and evaluating a response to that notification;
    following delivery of the notification to the second device, determining whether a verification response to the notification has been received; and
    when the verification response to the notification has been received, the verification response having been generated as a result of a valid response to receipt of the notification, providing a verification result to the first device;
    wherein receipt of the verification result at the first device unlocks the first device automatically based on the information in the data set;
    wherein current physical proximity is determined by the following sub-steps:
        determining whether a computed signal strength value is within a given transitional range indicating that presence of the second device is indeterminate;
        when it is determined that the computed signal strength value is within the given transitional range, determining whether the computed signal strength value has a given relationship with a prior computed signal strength value, the given relationship indicating a high confidence that the second device was previously in sufficient physical proximity to the first device; and
        when the computed signal strength value has the given relationship, accepting the second device as being in current physical proximity to the first device.

2. The method as described in claim 1 wherein the first device is a computer, and the second device is a mobile device.

3. The method as described in claim 2 wherein the mobile device executes a mobile application that facilitates verification of the user.

4. The method as described in claim 3 wherein the notification is a push notification to the mobile application.

5. The method as described in claim 3 wherein the push notification has a timeout associated therewith.

6. The method as described in claim 1 wherein the first device and the second device communicate over a wireless link.

7. The method as described in claim 6 wherein the wireless link is Bluetooth.

8. The method as described in claim 1 further including configuring the first device and the second device to facilitate generation of the data set.

9. The method as described in claim 1 wherein verification response to the notification is received automatically or via a poll.

10. The method as described in claim 1 wherein one or more operations are carried out in an identity provider (IdP).

* * * * *